(12) United States Patent
Yatsuri et al.

(10) Patent No.: US 10,384,608 B2
(45) Date of Patent: *Aug. 20, 2019

(54) VEHICLE-MOUNTED STEREO CAMERA DEVICE AND METHOD FOR CORRECTING THE SAME

(71) Applicant: Panasonic Intellectual Property Management Co., Ltd., Osaka (JP)

(72) Inventors: Shigenori Yatsuri, Osaka (JP); Norikazu Yamamoto, Kyoto (JP); Mitsuru Kashihara, Osaka (JP); Yuichi Suzuki, Osaka (JP); Ken Ishida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 39 days.

This patent is subject to a terminal disclaimer.

(21) Appl. No.: 15/488,560

(22) Filed: Apr. 17, 2017

(65) Prior Publication Data

US 2017/0217371 A1    Aug. 3, 2017

Related U.S. Application Data

(63) Continuation of application No. PCT/JP2016/002920, filed on Jun. 17, 2016.

(30) Foreign Application Priority Data

Sep. 7, 2015  (JP) .................................. 2015-175288

(51) Int. Cl.
*H04N 7/00*    (2011.01)
*B60R 1/00*    (2006.01)
(Continued)

(52) U.S. Cl.
CPC ............ *B60R 1/00* (2013.01); *G06K 9/00791* (2013.01); *G06K 9/00805* (2013.01);
(Continued)

(58) Field of Classification Search
USPC .................... 348/118, 120, 61, 42, 48, 51
See application file for complete search history.

(56) References Cited

U.S. PATENT DOCUMENTS 7,124,046 B2 *  10/2006  Maeda ...................... G06T 7/80
                                                      702/104
8,941,819 B2 *   1/2015  Anisimov ............... G01S 7/481
                                                       356/28
(Continued)

FOREIGN PATENT DOCUMENTS

DE    102013017341 A1    6/2014
EP         2500748 A2    9/2012
JP       2001-233139     8/2001

OTHER PUBLICATIONS

International Search Report of PCT application No. PCT/JP2016/002920 dated Sep. 6, 2016.
(Continued)

*Primary Examiner* — Daquan Zhao
(74) *Attorney, Agent, or Firm* — Renner, Otto, Boisselle & Sklar, LLP

(57) ABSTRACT

A vehicle-mounted stereo camera device that achieves high-precision distance detection is provided. The provided vehicle-mounted stereo camera device includes a left camera and right camera disposed on a vehicle to cause a visual field of the left camera and a visual field of the right camera to overlap each other, a stereo processor that calculates a distance to a body outside the vehicle based on images captured by the left camera and right camera and on positions of the left camera and right camera on the vehicle, and sensors disposed near the left camera and right camera for (Continued)

detecting displacement amounts of the left camera and right camera. The stereo processor changes a cutout positions in the images captured by the left camera and right camera based on the displacement amounts.

8 Claims, 11 Drawing Sheets

(51) Int. Cl.
<table>
<tr><td>G06T 7/70</td><td>(2017.01)</td></tr>
<tr><td>H04N 13/246</td><td>(2018.01)</td></tr>
<tr><td>G06K 9/00</td><td>(2006.01)</td></tr>
<tr><td>G07C 5/00</td><td>(2006.01)</td></tr>
<tr><td>G06K 9/20</td><td>(2006.01)</td></tr>
<tr><td>H04N 5/225</td><td>(2006.01)</td></tr>
<tr><td>H04N 13/239</td><td>(2018.01)</td></tr>
<tr><td>G06T 7/80</td><td>(2017.01)</td></tr>
<tr><td>H04N 13/00</td><td>(2018.01)</td></tr>
</table>

(52) U.S. Cl.
CPC ............... *G06K 9/209* (2013.01); *G06T 7/70* (2017.01); *G06T 7/85* (2017.01); *G07C 5/006* (2013.01); *H04N 5/2257* (2013.01); *H04N 5/2258* (2013.01); *H04N 13/239* (2018.05); *H04N 13/246* (2018.05); *B60K 2370/152* (2019.05); *B60K 2370/21* (2019.05); *B60K 2370/333* (2019.05); *B60R 2300/105* (2013.01); *B60R 2300/107* (2013.01); *B60R 2300/303* (2013.01); *B60R 2300/40* (2013.01); *G06T 2207/10012* (2013.01); *H04N 2013/0081* (2013.01)

(56) References Cited

U.S. PATENT DOCUMENTS

<table>
<tr><td>9,319,587</td><td>B2*</td><td>4/2016</td><td>Takao</td><td>H04N 5/23274</td></tr>
<tr><td>2007/0058049</td><td>A1*</td><td>3/2007</td><td>Kawahara</td><td>H04N 5/225<br>348/218.1</td></tr>
<tr><td>2007/0165910</td><td>A1*</td><td>7/2007</td><td>Nagaoka</td><td>B60W 40/04<br>382/104</td></tr>
<tr><td>2008/0143835</td><td>A1*</td><td>6/2008</td><td>Abe</td><td>B60R 1/00<br>348/148</td></tr>
<tr><td>2012/0050577</td><td>A1*</td><td>3/2012</td><td>Hongu</td><td>G02B 7/102<br>348/240.1</td></tr>
<tr><td>2017/0263014</td><td>A1*</td><td>9/2017</td><td>Kuznetsov</td><td>G01C 21/34</td></tr>
</table>

OTHER PUBLICATIONS

The Extended European Search Report dated Sep. 4, 2018 for the related European Patent Application No. 16843873.7.

* cited by examiner

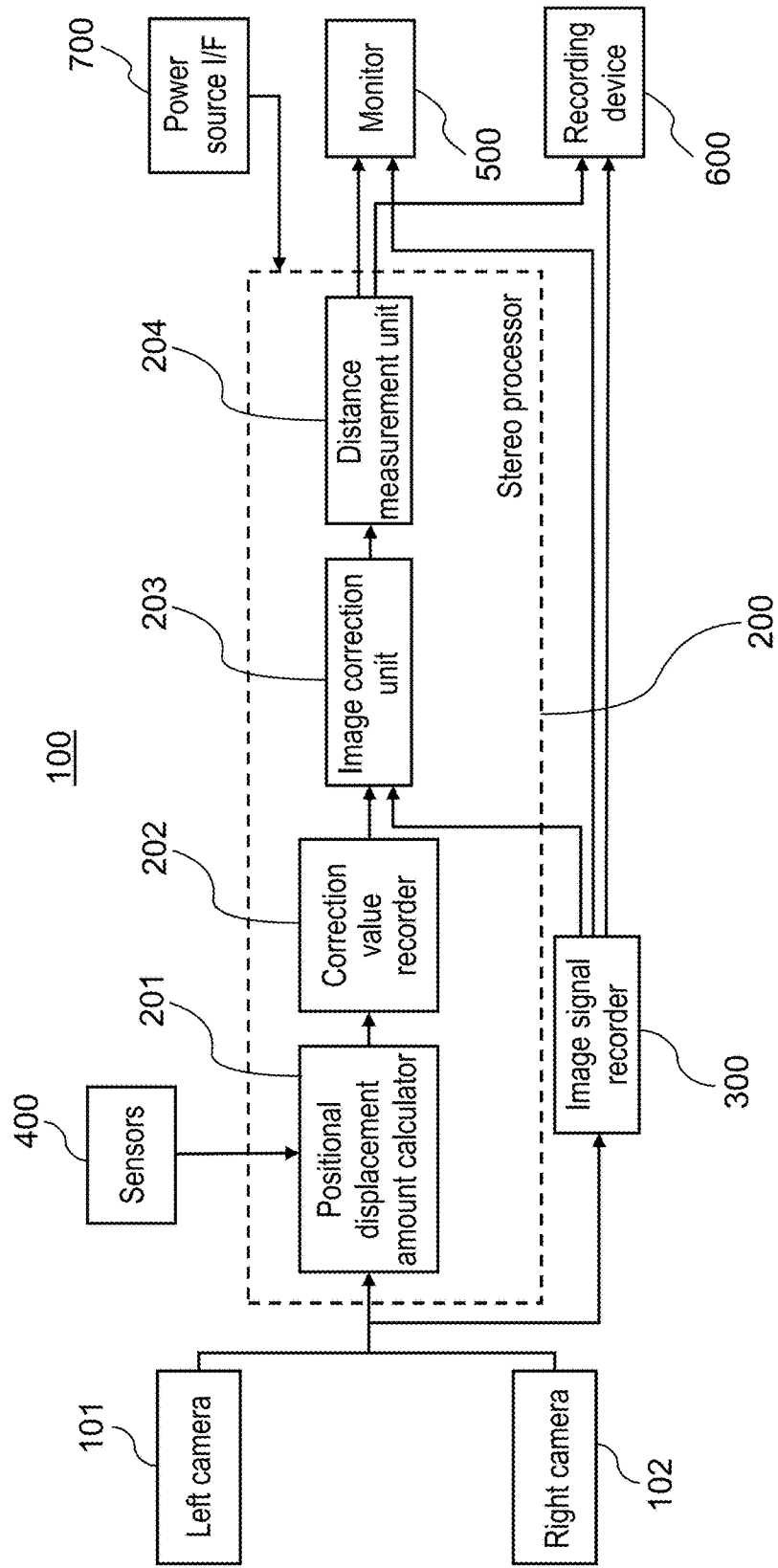

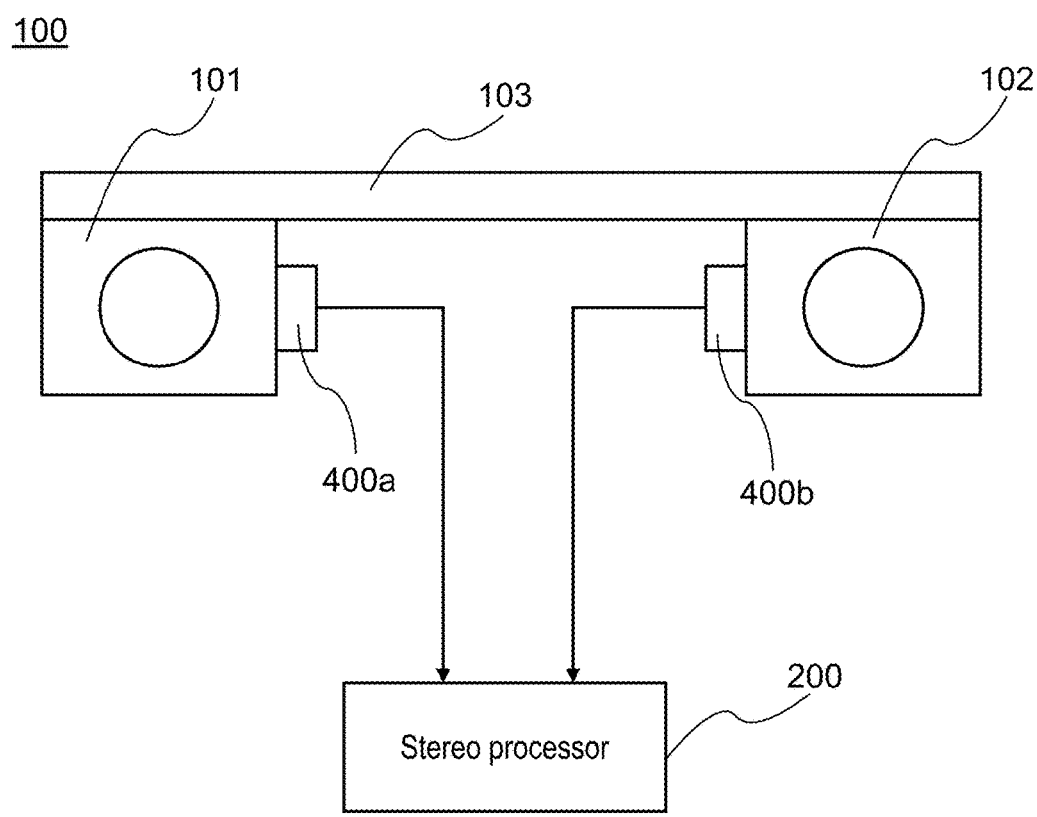

(a)  (b)

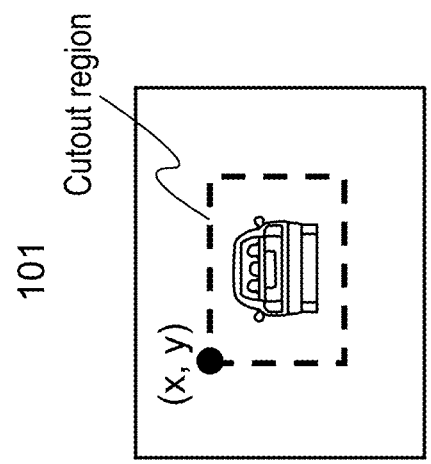
FIG. 4A
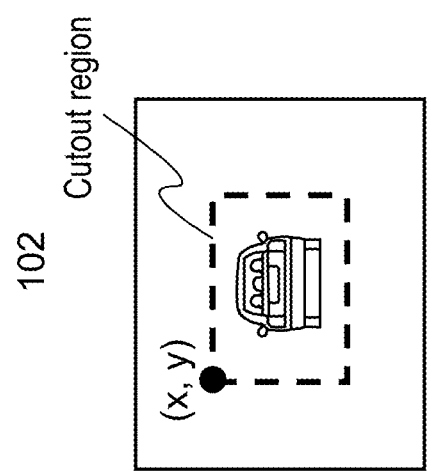
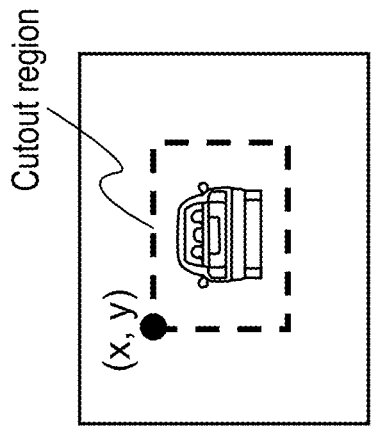
FIG. 4B
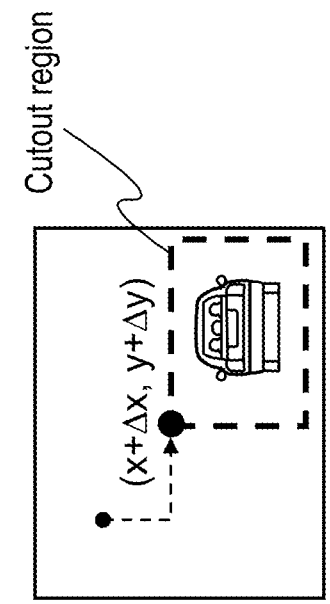

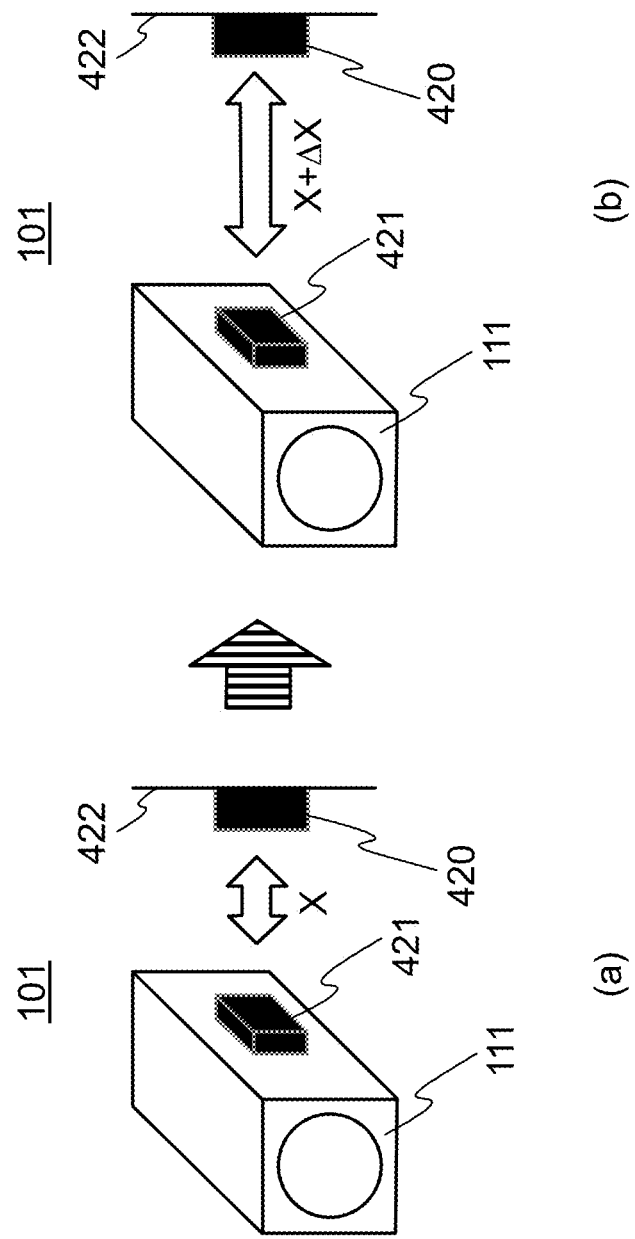

VEHICLE-MOUNTED STEREO CAMERA DEVICE AND METHOD FOR CORRECTING THE SAME

BACKGROUND

1. Technical Field

The present disclosure relates to a vehicle-mounted stereo camera device.

2. Description of Related Art

Unexamined Japanese Patent Publication No. 2001-233139 discloses a vehicle-mounted stereo camera device having a function to adjust a positional displacement. The vehicle-mounted stereo camera device described in Unexamined Japanese Patent Publication No. 2001-233139 adjusts the positional displacement of a stereo camera based on an image obtained by capturing a fender marker.

SUMMARY

The vehicle-mounted stereo camera device according to the present disclosure includes: a first image capturing unit and a second image capturing unit disposed on a vehicle to cause a visual field of the first image capturing unit and a visual field of the second image capturing unit to overlap each other; and a controller that calculates a distance to a body outside the vehicle based on an image captured by the first image capturing unit, on an image captured by the second image capturing unit, and on positions of the first image capturing unit and the second image capturing unit on the vehicle. Furthermore, the vehicle-mounted stereo camera device according to the present disclosure includes: a first detector that is disposed near the first image capturing unit and that detects a displacement amount of the first image capturing unit; and a second detector that is disposed near the second image capturing unit and that detects a displacement amount of the second image capturing unit. Based on the displacement amount detected by the first detector, the controller changes a cutout position in the image captured by the first image capturing unit. Based on the displacement amount detected by the second detector, the controller changes a cutout position in the image captured by the second image capturing unit.

The vehicle-mounted stereo camera device according to the present disclosure can achieve high-precision distance detection.

BRIEF DESCRIPTION OF DRAWINGS

FIG. 1 is a block diagram illustrating a configuration of a vehicle-mounted stereo camera device according to the first exemplary embodiment.

FIG. 2 is a schematic view illustrating the configuration of the vehicle-mounted stereo camera device according to the first exemplary embodiment.

FIG. 4A is a diagram illustrating change processing of a cutout position according to the first exemplary embodiment.

FIG. 4B is a diagram illustrating the change processing of the cutout position according to the first exemplary embodiment.

FIG. 6A is a diagram illustrating the configuration of the sensor according to the second exemplary embodiment.

DETAILED DESCRIPTION

Figure 3A:
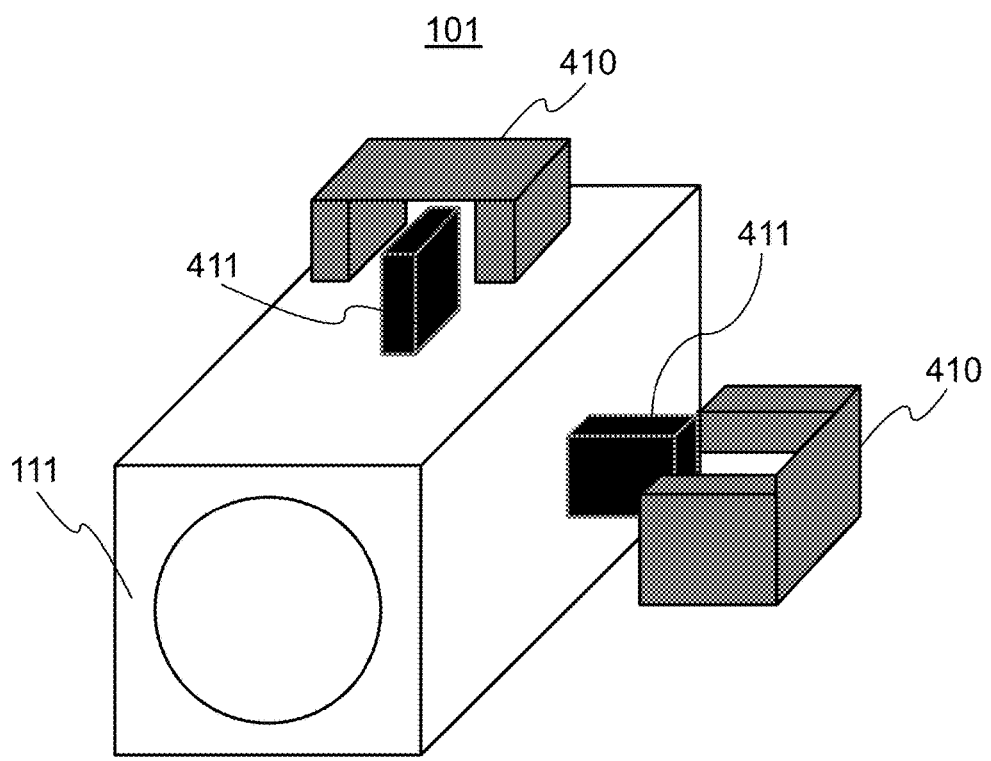
FIG. 3A is a diagram illustrating a configuration of a sensor according to the first exemplary embodiment.

Exemplary embodiments will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments.

It is to be noted that the accompanying drawings and the following description are provided in order for a person skilled in the art to fully understand the present disclosure, and are not intended to limit the subject described in the appended claims.

The exemplary embodiments will be described below with reference to FIGS. 1 to 8.

First Exemplary Embodiment

[Configuration of Vehicle-Mounted Stereo Camera Device]

FIG. 1 is a block diagram illustrating a configuration of vehicle-mounted stereo camera device 100 according to the first exemplary embodiment. In FIG. 1, vehicle-mounted stereo camera device 100 includes left camera (first image capturing unit) 101, right camera (second image capturing unit) 102, stereo processor (controller) 200, image signal recorder 300, sensors 400, monitor 500, recording device 600, and power source I/F 700.

Image signals captured by left camera 101 and right camera 102 are input into stereo processor 200 and image signal recorder 300. Stereo processor 200 determines parallax from a matching level of two images by using a technique of image matching. Stereo processor 200 calculates a distance to an object to be measured that exists outside a vehicle by a principle of triangulation based on the parallax and a distance between left camera 101 and right camera 102. Sensors 400 acquire physical positional information about each of left camera 101 and right camera 102, and send the acquired physical positional information to stereo processor 200. The image signals captured by left camera 101 and right camera 102, and distance results calculated by stereo processor 200 are displayed on monitor 500 and are recorded in recording device 600. Power source I/F 700 supplies electricity from a cigarette lighter socket, a battery, or the like of the vehicle to each unit.

Stereo processor 200 includes positional displacement amount calculator 201 that calculates displacement amounts based on the physical positional information on left camera 101 and right camera 102 obtained from sensors 400, correction value recorder 202 that records the positional displacement amounts, image correction unit 203 that changes cutout positions of images captured by left camera 101 and right camera 102 based on the positional displacement amounts, and distance measurement unit 204 that calculates the parallax from the cutout right and left images and converts the parallax into the distance to the object to be measured.

FIG. 2 is a schematic view illustrating the configuration of vehicle-mounted stereo camera device 100 according to the first exemplary embodiment. In FIG. 2, left camera 101 and right camera 102 are mounted inside the vehicle at a distance of a base length away via frame 103 to cause visual fields to overlap each other. Left camera 101 and right camera 102 are adjusted during manufacturing to cause optical axes to become parallel with each other. Each of left camera 101 and right camera 102 includes an imaging element, a zoom lens, a focus lens, a fixed lens, and other elements.

According to the present disclosure, in order to detect the positional displacements of the right camera and the left camera, first sensor (first detector) 400a is disposed near left camera 101, and second sensor (second detector) 400b is disposed near right camera 102. Sensors 400 including first sensor 400a and second sensor 400b acquire the physical positional information on left camera 101 and right camera 102. The acquired positional information is input into stereo processor 200. Stereo processor 200 performs correction for changing the cutout positions of the images based on a change in the positional information, and then stereo processor 200 measures the distance to the object based on the corrected images.

For this reason, even if a fixation state of left camera 101 and right camera 102 is changed from a fixation state adjusted during manufacturing, causing a positional displacement, vehicle-mounted stereo camera device 100 according to the present disclosure can achieve high-precision distance measurement without errors during the distance measurement.

[Configuration of Sensor]

FIG. 3A is a diagram illustrating a configuration of sensors 400 according to the first exemplary embodiment. According to the first exemplary embodiment, photointerrupters 410x, 410y are used as sensors 400. While FIG. 3A illustrates only the configuration of left camera 101 for purposes of simple description, right camera 102 also has a similar configuration. In FIG. 3A, light-shielding sections 411x, 411y are provided on lens 111 of left camera 101, and photointerrupters 410x, 410y corresponding thereto are installed on a holder (not illustrated) that holds lens 111. Photointerrupters 410x, 410y have a mechanism in which an electric current flows when light is detected, and photointerrupters 410x, 410y acquire the physical positional information on the camera from an electric current value obtained.

Figure 3B:
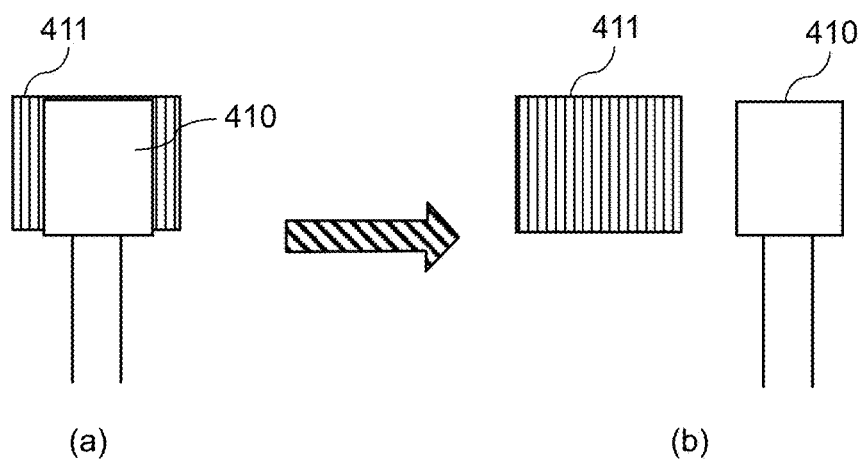
FIG. 3B is a diagram illustrating the sensor according to the first exemplary embodiment.
Figure 3C:
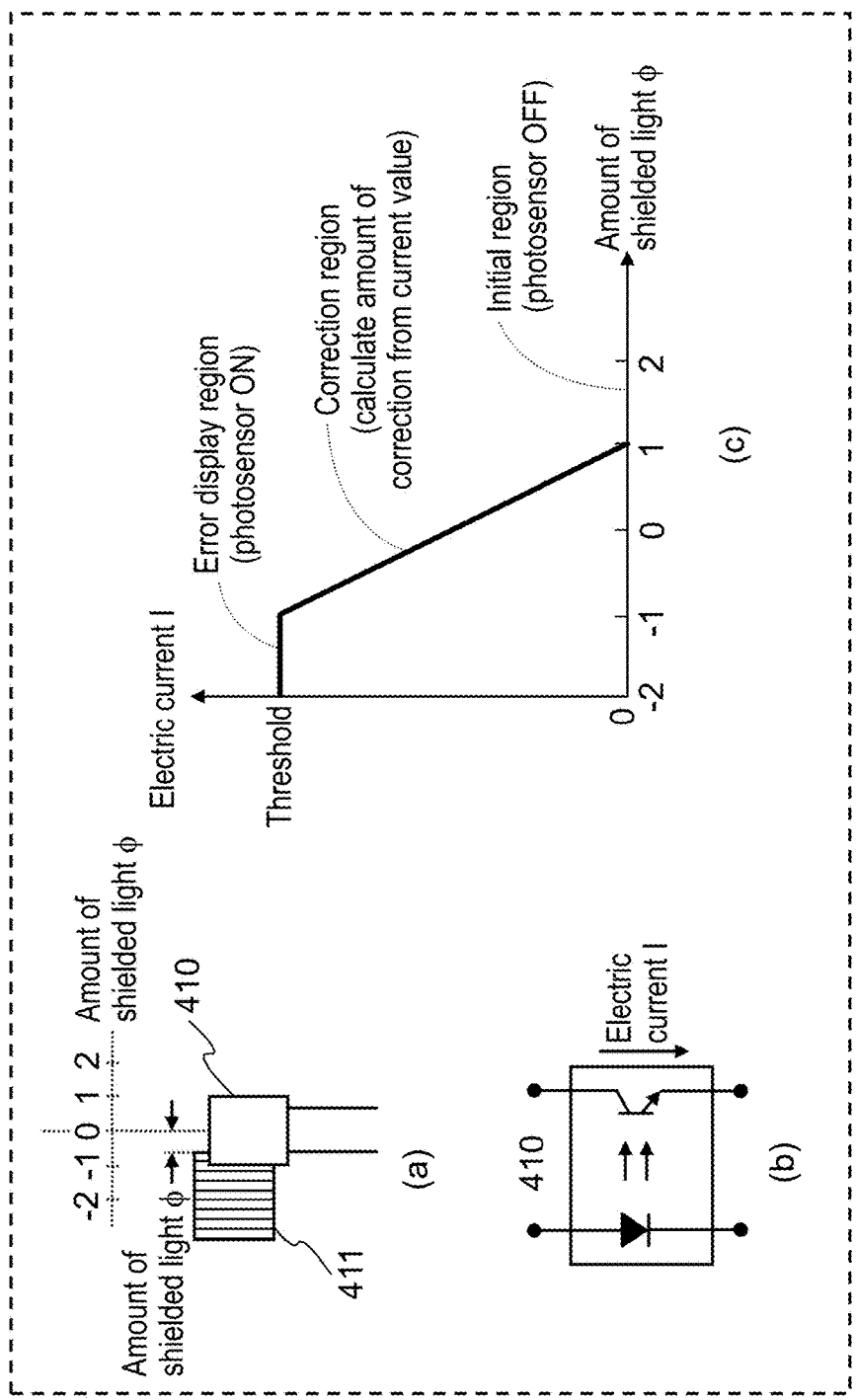
FIG. 3C is a diagram illustrating the sensor according to the first exemplary embodiment.

FIG. 3B and FIG. 3C are diagrams illustrating sensors 400 according to the first exemplary embodiment. FIG. 3B is a diagram illustrating a positional relationship between photointerrupter 410x and light-shielding section 411x corresponding thereto in an initial state and an aging state as one example. As illustrated in (a) of FIG. 3B, in the initial state, photointerrupter 410x is fixed in a state of being shielded by light-shielding section 411x in a manufacturing stage, and thus no electric current flows through photointerrupter 410x, and photointerrupter 410x is turned OFF.

Meanwhile, in the aging state, lens 111 of the camera cannot keep its initial position with respect to the holder, which causes displacement in a mutual positional relationship. In particular, for on-vehicle applications, influence of temperature change, vibration, and the like inside the vehicle is large and is likely to cause positional displacements. In the aging state, as illustrated in (b) of FIG. 3B, since lens 111 changes from a position of the initial state, light-shielding section 411x installed on lens 111 stops shielding photointerrupter 410x installed on the holder. Accordingly, an electric current starts to flow through photointerrupter 410x and when the current value exceeds a certain threshold, photointerrupter 410x is turned ON. This state means that the camera has changed a lot from the position of the initial state, and the camera cannot perform accurate distance measurement in this state. Accordingly, when photointerrupter 410x is turned ON, a user is notified that maintenance is needed (error). Note that photointerrupter 410y and light-shielding section 411y corresponding thereto in the initial state and aging state also have similar positional relationship.

FIG. 3C is a diagram illustrating a method for performing correction when the camera changes slightly from the position of the initial state. As illustrated in (b) of FIG. 3C, photointerrupter 410x has a configuration in which a light-receiving element (photosensor) and a light-emitting element face each other as one example. Also, as illustrated in (a) of FIG. 3C, when light-shielding section 411x shields part of photointerrupter 410x ($-1 <$ amount of shielded light $\phi < 1$), an electric current proportional to amount of shielded light $\phi$ flows through photointerrupter 410x. The detected current value is recorded in positional displacement amount calculator 201. Amount of shielded light $\phi$, that is, the positional displacement amount of the camera is calculated from a characteristic between current value I and amount of shielded light $\phi$ prepared in advance as illustrated in (c) of FIG. 3C, and the positional displacement amount of the camera is input into correction value recorder 202. Then, image correction unit 203 performs image correction for changing the cutout position by the value that is input into correction value recorder 202, and then distance measurement unit 204 performs distance measurement. Thus, correcting the positional displacements of the cameras enables high-precision distance measurement equivalent to distance measurement performed when the cameras are at initial positions.

[Image Cutout Position Change Processing]

FIG. 4A and FIG. 4B are diagrams illustrating change processing of the cutout position according to the first exemplary embodiment. FIG. 4A and FIG. 4B are diagrams illustrating processing to be performed by image correction unit 203 by using the images in the initial state and the aging state acquired by left camera 101 and right camera 102.

As illustrated in FIG. 4A, in the initial state, image correction unit 203 cuts out an image having a certain region from a predetermined position (x, y), and then inputs the cutout image into distance measurement unit 204 for distance measurement.

Next, FIG. 4B illustrates processing in the aging state. Here, consider one example in which positional displacement occurs only in right camera 102. Among the image signals captured by left camera 101 and right camera 102, image correction unit 203 changes the cutout position of the image signal captured by displaced right camera 102 to the position $(x+\Delta x, y+\Delta y)$ obtained by performing parallel translation of a correction value $(\Delta x, \Delta y)$ corresponding to the positional displacement amount detected by the sensor. Then, image correction unit 203 cuts out an image having a certain region from the position and inputs the image into distance measurement unit 204. Accordingly, distance measurement unit 204 receives the image of a range identical to a cutout range in the initial state, and performing image matching within the cutout range enables accurate distance measurement without any change from the initial state.

[Calibration Processing]

Figure 5:
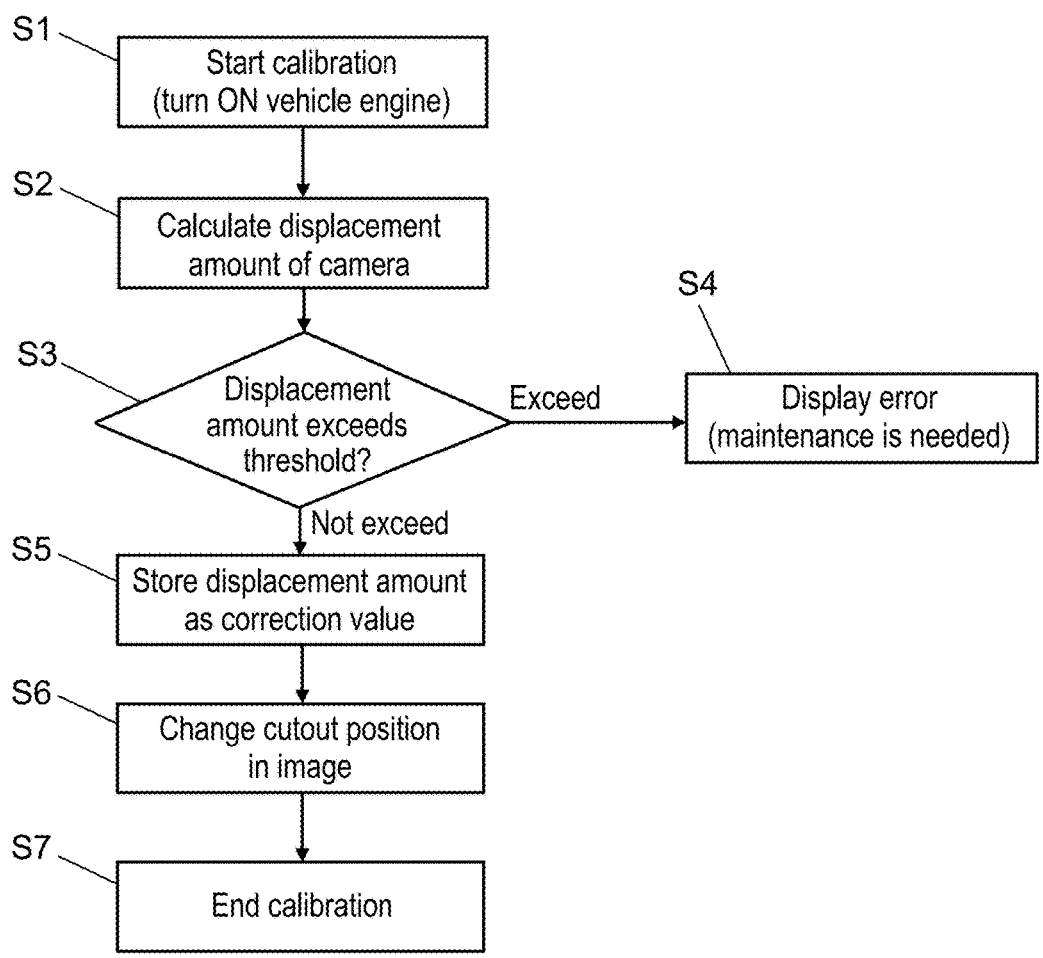
FIG. 5 is a flowchart illustrating calibration processing according to the first exemplary embodiment.

FIG. 5 is a flowchart illustrating calibration processing of vehicle-mounted stereo camera device 100. When a driver starts an engine of a vehicle, image signals captured by left camera 101 and right camera 102 are input into stereo processor 200, and then calibration processing starts (S1). Positional displacement amount calculator 201 of stereo processor 200 calculates the physical displacement amounts of the cameras (S2). A certain threshold is provided in advance for the displacement amounts calculated here, and stereo processor 200 determines whether at least one of the displacement amounts exceeds the threshold (S3). When the at least one of the displacement amounts exceeds the threshold, stereo processor 200 causes monitor 500 to display an error and notifies the driver that maintenance is needed (S4).

On the other hand, when none of the displacement amounts exceeds the threshold, stereo processor 200 stores the displacement amounts in correction value recorder 202 as the correction values (S5). Image correction unit 203 then changes the cutout position by a number of pixels corresponding to each correction value in each image captured by each of left camera 101 and right camera 102 (S6). Distance measurement unit 204 receives the cutout right and left images to perform distance measurement. Thus, the calibration ends (S7). Performing this processing every time the user starts the engine of the vehicle always enables accurate distance measurement.

Second Exemplary Embodiment

Next, the second exemplary embodiment will be described. The second exemplary embodiment differs from the above-described first exemplary embodiment only in [Configuration of sensor]. Hereinafter, only components of the second exemplary embodiment that differ from components of the first exemplary embodiment will be described.

Figure 6B:
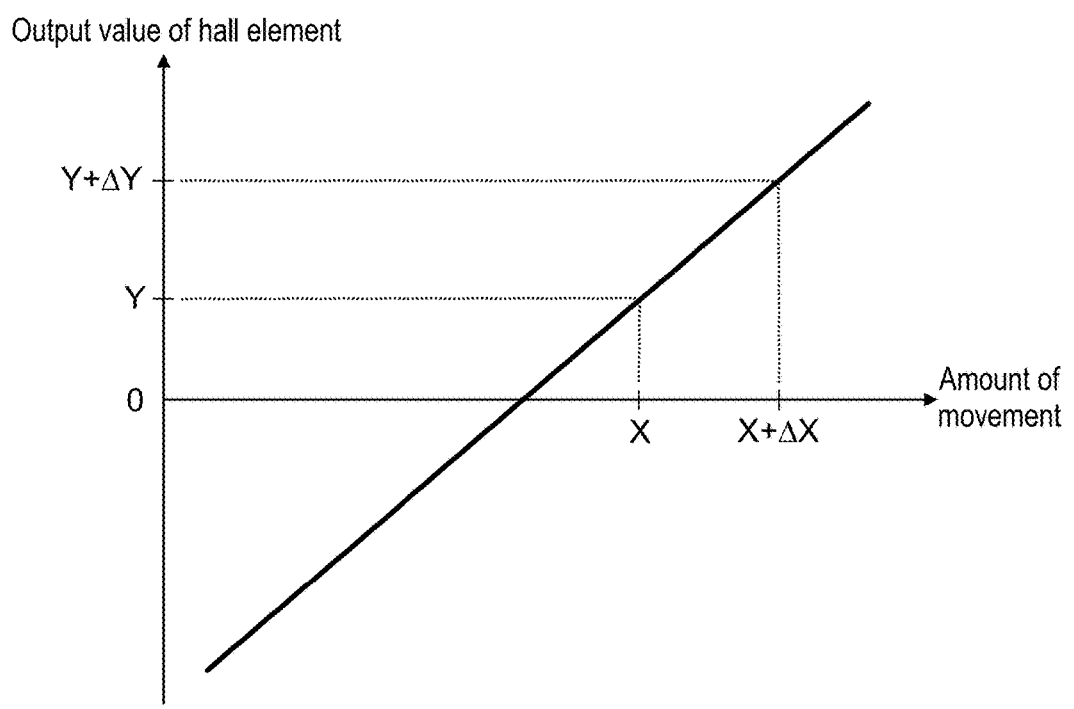
FIG. 6B is a diagram illustrating the sensor according to the second exemplary embodiment.

FIG. 6A is a diagram illustrating a configuration of sensors 400 according to the second exemplary embodiment. FIG. 6B is a diagram illustrating sensors 400 according to the second exemplary embodiment. According to the second exemplary embodiment, Hall element 420 is used as sensors 400. While FIG. 6A illustrates only a configuration of left camera 101 for purposes of simple description, right camera 102 also has a similar configuration. A magnet (magnetic substance) 421 is installed on lens 111 of left camera 101, whereas Hall element 420 is installed on holder 422 that supports lens 111. An output value of Hall element 420 varies according to a positional relationship with magnet 421 that makes a pair. A characteristic of an amount of positional change between the Hall element and the camera as illustrated in FIG. 6B is prepared in advance as correction data, and correction is performed using the characteristic.

For example, in FIG. 6B, it is assumed that a value detected by Hall element 420 in an initial state is "Y." In this case, magnet 421 and Hall element 420 are installed at a distance "X" away. Positional displacement amount calculator 201 records "Y" obtained here as an initial value.

Meanwhile, in an aging state, lens 111 of the camera cannot keep its initial position with respect to holder 422, which causes displacement in a mutual positional relationship. Accordingly, when a value is similarly detected by Hall element 420, "Y" will change to "Y+ΔY." Similarly, positional displacement amount calculator 201 records this value, and calculates an amount of change "ΔY" with respect to initial value "Y." Then, positional displacement amount calculator 201 calculates an amount of change in a camera position "ΔX" corresponding to the amount of change in the value of Hall element 420 "ΔY" from the characteristic of the amount of positional change between Hall element 420 and the camera which is prepared in advance as the correction data. This indicates that the distance between magnet 421 and Hall element 420 changes to "X+ΔX." Thus, correcting the positional displacement amount of the camera enables highly accurate distance measurement that is not different from distance measurement performed when the camera is at the position of the initial state.

Third Exemplary Embodiment

Next, the third exemplary embodiment will be described. The third exemplary embodiment differs from the above-described first exemplary embodiment only in [Configuration of sensor]. Hereinafter, only components of the third exemplary embodiment that differ from components of the first exemplary embodiment will be described.

Figure 7:
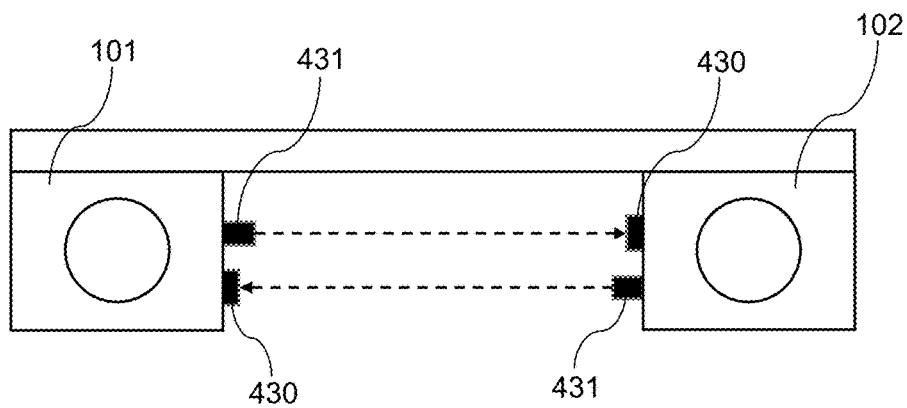
FIG. 7 is a diagram illustrating the configuration of the sensor according to the third exemplary embodiment.

FIG. 7 is a diagram illustrating a configuration of sensors 400 according to the third exemplary embodiment. According to the third exemplary embodiment, first light-receiving element 430a and second light-receiving element 430b are used as sensors 400. In FIG. 7, first laser beam-emitting element 431a and first light-receiving element 430a are attached near left camera 101. Second laser beam-emitting element 431b and second light-receiving element 430b are attached near right camera 102. First laser beam-emitting element 431a and second light-receiving element 430b face each other. First light-receiving element 430a and second laser beam-emitting element 431b face each other. First laser beam-emitting element 431a and second laser beam-emitting element 431b which are attached to one camera emit laser beam toward second light-receiving element 430b and first light-receiving element 430a which are attached to another camera, respectively. Although the laser beam is concentrated at a position determined in advance in an initial state, the concentration position of the laser beam changes from the determined position in an aging state. This enables determination whether the position of the camera has changed, and enables correction according to the positional displacement amount of the camera for distance measurement.

Fourth Exemplary Embodiment

Next, the fourth exemplary embodiment will be described. The fourth exemplary embodiment differs from the above-described first exemplary embodiment only in [Configuration of sensor]. Hereinafter, only components of the fourth exemplary embodiment that differ from components of the first exemplary embodiment will be described.

Figure 8:
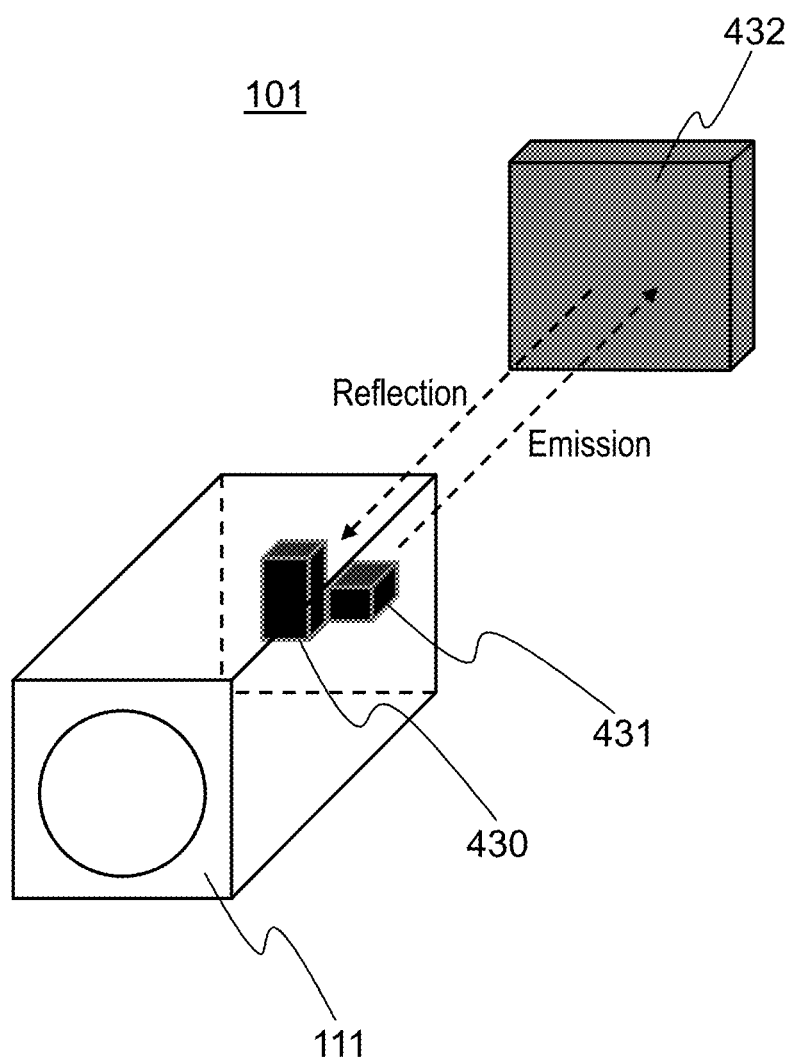
FIG. 8 is a diagram illustrating the configuration of the sensor according to the fourth exemplary embodiment.

FIG. 8 is a diagram illustrating a configuration of sensors 400 according to the fourth exemplary embodiment. According to the fourth exemplary embodiment, first light-receiving element 430a is used as sensors 400 in a similar manner to the third exemplary embodiment.

According to the fourth exemplary embodiment, first laser beam-emitting element 431a and first light-receiving element 430a are disposed behind lens 111. First laser beam-emitting element 431a emits a laser beam toward a back of lens 111, and first light-receiving element 430a receives reflected light from reflecting plate 432 disposed backward. This makes it possible to perform correction according to the positional displacement amount of the camera for distance measurement.

While the fourth exemplary embodiment has described a case of left camera 101 as one example, this also applies to a case of right camera 102.

Other Exemplary Embodiments

As described above, the first to fourth exemplary embodiments have been described as illustration of the technique to be disclosed in this application. The technique in the present disclosure however is not limited to these exemplary embodiments, and may be applied to exemplary embodiments to which changes, replacements, additions, and omissions have been made. It is also possible to make a new exemplary embodiment by combining components described in the aforementioned first to fourth exemplary embodiments.

Therefore, other exemplary embodiments will be illustrated below.

In [Configuration of sensor] of the first exemplary embodiment, an example has been described in which the amount of shielded light is used as a parameter. However, the sensor can also be configured to control a current value by changing transmittance of the light-shielding section.

In [Calibration processing] of the first exemplary embodiment, every time calculating the displacement amounts in S2, stereo processor 200 determines whether the displacement amounts exceed the threshold. However, it is also possible to record the displacement amounts multiple times and to determine whether the displacement amounts exceed the threshold by using an average of the displacement amounts or the like. It is also possible to change the cutout position based on the average of the displacement amounts recorded multiple times or the like.

It is to be noted that since the aforementioned exemplary embodiments are intended to illustrate the technique in the present disclosure, various changes, replacements, additions, omissions, and the like may be made within the scope of the appended claims or equivalents thereof.

The present disclosure can be applied to the vehicle-mounted stereo camera device.

What is claimed is:

1. A vehicle-mounted stereo camera device comprising:
   a first image capturing unit and a second image capturing unit disposed on a vehicle to cause a visual field of the first image capturing unit and a visual field of the second image capturing unit to overlap each other;
   a controller that calculates a distance to a body outside the vehicle based on an image captured by the first image capturing unit, on an image captured by the second image capturing unit, and on positions of the first image capturing unit and the second image capturing unit on the vehicle;
   a first detector disposed near the first image capturing unit, the first detector detecting a first physical positional information of the first image capturing unit, the first physical positional information corresponding to a distance between an initial position of the first imaging unit at a first timing and a final position of the first imaging unit at a second timing after the first timing, the initial position of the first imaging unit adjusted at manufacturing of the vehicle-mounted stereo camera device, wherein the controller determines a positional displacement amount of the first image capturing unit based on the first physical positional information; and
   a second detector disposed near the second image capturing unit, the second detector detecting a second physical positional information of the second image capturing unit, the second physical information corresponding to a distance between an initial position of the second imaging unit at a first timing and a final position of the second imaging unit at a second timing after the first timing, the initial position of the second imaging unit adjusted at manufacturing of the vehicle-mounted stereo camera device, wherein the controller determines a positional displacement amount of the second image capturing unit based on the second physical positional information,
   wherein based on the determined positional displacement amount of the first image capturing unit, the controller changes a cutout position in the image captured by the first image capturing unit, and based on the determined positional displacement amount of the second image capturing unit, the controller changes a cutout position in the image captured by the second image capturing unit.

2. The vehicle-mounted stereo camera device according to claim 1, wherein
   the first detector includes:
   a first photointerrupter held on one of the first image capturing unit and a holder holding the first image capturing unit; and
   a first light-shielding section held on the other of the first image capturing unit and the holder holding the first image capturing unit, the first light-shielding section being disposed on an optical path of the first photointerrupter, and
   the second detector includes:
   a second photointerrupter held on one of the second image capturing unit and a holder holding the second image capturing unit; and
   a second light-shielding section held on the other of the second image capturing unit and the holder holding the second image capturing unit, the second light-shielding section being disposed on an optical path of the second photointerrupter.

3. The vehicle-mounted stereo camera device according to claim 1, wherein
   the first detector includes:
   a first Hall element held on one of the first image capturing unit and a holder holding the first image capturing unit; and
   a first magnetic substance held on the other of the first image capturing unit and the holder holding the first image capturing unit, and
   the second detector includes:
   a second Hall element held on one of the second image capturing unit and a holder holding the second image capturing unit; and
   a second magnetic substance held on the other of the second image capturing unit and the holder holding the second image capturing unit.

4. The vehicle-mounted stereo camera device according to claim 1, wherein
   the first detector includes a first laser beam-emitting element and a first light-receiving element which are held on the first image capturing unit, and
   the second detector includes a second laser beam-emitting element and a second light-receiving element which are held on the second image capturing unit.

5. The vehicle-mounted stereo camera device according to claim 1, wherein
the first detector includes:
a first laser beam-emitting element and a first light-receiving element which are held on one of the first image capturing unit and a holder holding the first image capturing unit; and
a first reflecting plate held on the other of the first image capturing unit and the holder holding the first image capturing unit, and
the second detector includes:
a second laser beam-emitting element and a second light-receiving element which are held on one of the second image capturing unit and a holder holding the second image capturing unit; and
a second reflecting plate held on the other of the second image capturing unit and the holder holding the second image capturing unit.

6. The vehicle-mounted stereo camera device according to claim 1, wherein the controller:
calculates and stores the positional displacement amounts a plurality of times;
calculates an average of the positional displacement amounts the plurality of times; and
changes the cutout positions based on the average of the positional displacement amounts.

7. A correction method of a vehicle-mounted stereo camera device comprising detectors disposed near image capturing units for detecting positional displacement amounts of the image capturing units, the correction method comprising the steps of:
detecting the positional displacement amounts of the image capturing units by the detectors, wherein:
the positional displacement amounts comprise a positional displacement amount for each of the image capturing units;
each positional displacement amount comprises a distance between an initial position of a particular image capturing unit at a first timing and a final position of the particular image capturing unit at a second timing after the first timing; and
the initial position of each of the imaging units is adjusted at manufacturing of the vehicle mounted stereo camera device; and
changing a cutout position in an image captured by each of the image capturing units based on the positional displacement amounts.

8. The correction method of a vehicle-mounted stereo camera device according to claim 7, the correction method further comprising the steps of:
calculating and storing the positional displacement amounts a plurality of times;
calculating an average of the positional displacement amounts for the plurality of stored positional displacement amounts; and
changing the cutout positions based on the calculated average of the positional displacement amounts.

* * * * *